United States Patent [19]

Fujisawa

[11] Patent Number: 5,289,294
[45] Date of Patent: Feb. 22, 1994

[54] IMAGE PROCESSING APPARATUS

[75] Inventor: Tetsuo Fujisawa, Urawa, Japan

[73] Assignee: Ricoh Company, Ltd., Japan

[21] Appl. No.: 676,571

[22] Filed: Mar. 28, 1991

[30] Foreign Application Priority Data

Apr. 2, 1990 [JP] Japan ................... 2-84982

[51] Int. Cl.⁵ .................. H04N 1/40; H04N 1/38
[52] U.S. Cl. .................. 358/461; 358/463; 382/54
[58] Field of Search ............ 358/456, 457, 458, 459, 358/460, 261.2, 443, 461, 463; 382/54

[56] References Cited

U.S. PATENT DOCUMENTS

| | | | |
|---|---|---|---|
| 4,876,610 | 10/1989 | Ohsawa et al. | 382/54 |
| 4,958,238 | 9/1990 | Katayama et al. | 358/456 |
| 5,077,615 | 12/1991 | Tsuji | 358/461 |
| 5,077,812 | 12/1991 | Kanno et al. | 358/261.2 |
| 5,231,677 | 7/1993 | Mita et al. | 382/54 |

OTHER PUBLICATIONS

H. Kotera, "Digital Halftoning," *Institute of Television Engineers of Japan*, vol. 40, No. 4, (1986), pp. 317–323.

Primary Examiner—Edward L. Coles, Sr.
Assistant Examiner—Jerome Grant, II
Attorney, Agent, or Firm—Mason, Fenwick & Lawrence

[57] ABSTRACT

An image processing apparatus comprises a first correction part for correcting an error of an input multilevel tone data so that a corrected data having a speficied number of bits is supplied, a multilevel rendition part for generating a multilevel rendition data and an error data from the corrected data being compared with a plurality of predetermined threshold levels, an error diffusion part for carrying out a prescribed error diffusion of the error data and for supplying a resulting error data for use in an error correction process of a subsequent data, and a second correction part for correcting the multilevel rendition data by a specified bit of the input multilevel tone data so that a corrected multilevel image data that is appropriate for being outputted by an output unit in which a multilevel tone data is assigned to each pixel included in an output image data is supplied.

8 Claims, 6 Drawing Sheets

| ADDRESS | DATA | |
|---|---|---|
| ID + G | ID' | G' |
| 0 | 0 | 0 |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 0 | 9 |
| 10 | 0 | 10 |
| 11 | 0 | 11 |
| 12 | 0 | 12 |
| 13 | 0 | 13 |
| 14 | 0 | 14 |
| 15 | 0 | 15 |
| 16 | 1 | 0 |
| 17 | 1 | 1 |
| 18 | 1 | 2 |
| 19 | 1 | 3 |
| 20 | 1 | 4 |
| 21 | 1 | 5 |
| 22 | 1 | 6 |
| 23 | 1 | 7 |
| 24 | 1 | 8 |
| 25 | 1 | 9 |
| 26 | 1 | 10 |
| 27 | 1 | 11 |
| 28 | 1 | 12 |
| 29 | 1 | 13 |
| 30 | 1 | 14 |
| 31 | 1 | 15 |
| 32 | 2 | 0 |
| 33 | 2 | 1 |
| 34 | 2 | 2 |
| 35 | 2 | 3 |
| 36 | 2 | 4 |
| 37 | 2 | 5 |
| 38 | 2 | 6 |
| 39 | 2 | 7 |
| 40 | 2 | 8 |
| 41 | 2 | 9 |
| 42 | 2 | 10 |
| 43 | 2 | 11 |
| 44 | 2 | 12 |
| 45 | 2 | 13 |
| 46 | 2 | 14 |
| 47 | 2 | 15 |
| 48 | 3 | 0 |

(b)

| ADDRESS | DATA | |
|---|---|---|
| ID + G | ID' | G' |
| 49 | 3 | 1 |
| 50 | 3 | 2 |
| 51 | 3 | 3 |
| 52 | 3 | 4 |
| 53 | 3 | 5 |
| 54 | 3 | 6 |
| 55 | 3 | 7 |
| 56 | 3 | 8 |
| 57 | 3 | 9 |
| 58 | 3 | 10 |
| 59 | 3 | 11 |
| 60 | 3 | 12 |
| 61 | 3 | 13 |
| 62 | 3 | 14 |
| 63 | 3 | 15 |
| 64 | 4 | 0 |
| 65 | 4 | 1 |
| 66 | 4 | 2 |
| 67 | 4 | 3 |
| 68 | 4 | 4 |
| 69 | 4 | 5 |
| 70 | 4 | 6 |
| 71 | 4 | 7 |
| 72 | 4 | 8 |
| 73 | 4 | 9 |
| 74 | 4 | 10 |
| 75 | 4 | 11 |
| 76 | 4 | 12 |
| 77 | 4 | 13 |
| 78 | 4 | 14 |
| 79 | 4 | 15 |
| 80 | 5 | 0 |
| 81 | 5 | 1 |
| 82 | 5 | 2 |
| 83 | 5 | 3 |
| 84 | 5 | 4 |
| 85 | 5 | 5 |
| 86 | 5 | 6 |
| 87 | 5 | 7 |
| 88 | 5 | 8 |
| 89 | 5 | 9 |
| 90 | 5 | 10 |
| 91 | 5 | 11 |
| 92 | 5 | 12 |
| 93 | 5 | 13 |
| 94 | 5 | 14 |
| 95 | 5 | 15 |
| 96 | 6 | 0 |
| 97 | 6 | 1 |

(c)

| ADDRESS | DATA | |
|---|---|---|
| ID + G | ID' | G' |
| 98 | 6 | 2 |
| 99 | 6 | 3 |
| 100 | 6 | 4 |
| 101 | 6 | 5 |
| 102 | 6 | 6 |
| 103 | 6 | 7 |
| 104 | 6 | 8 |
| 105 | 6 | 9 |
| 106 | 6 | 10 |
| 107 | 6 | 11 |
| 108 | 6 | 12 |
| 109 | 6 | 13 |
| 110 | 6 | 14 |
| 111 | 6 | 15 |
| 112 | 7 | 0 |
| 113 | 7 | 1 |
| 114 | 7 | 2 |
| 115 | 7 | 3 |
| 116 | 7 | 4 |
| 117 | 7 | 5 |
| 118 | 7 | 6 |
| 119 | 7 | 7 |
| 120 | 7 | 8 |
| 121 | 7 | 9 |
| 122 | 7 | 10 |
| 123 | 7 | 11 |
| 124 | 7 | 12 |
| 125 | 7 | 13 |
| 126 | 7 | 14 |
| 127 | 7 | 15 |
| 128 | 8 | 0 |
| 129 | 8 | 1 |
| 130 | 8 | 2 |
| 131 | 8 | 3 |
| 132 | 8 | 4 |
| 133 | 8 | 5 |
| 134 | 8 | 6 |
| 135 | 8 | 7 |
| 136 | 8 | 8 |
| 137 | 8 | 9 |
| 138 | 8 | 10 |
| 139 | 8 | 11 |
| 140 | 8 | 12 |
| 141 | 8 | 13 |
| 142 | 8 | 14 |
| 143 | 8 | 15 |

IMAGE PROCESSING APPARATUS

BACKGROUND OF THE INVENTION

The present invention relates generally to an image processing apparatus, and more particularly to an image processing apparatus which is applied to an image processing part of a digital image output unit, such as a copier, a facsimile or a printer, by which pseudo halftone images having an appropriate image quality can be generated from a multilevel tone data by making use of a prescribed image processing technique.

Conventionally, the dither process, which is a prior image processing technique, has been used to generate a halftone data from a multilevel tone data inputted from an original document by a scanner, and convert the halftone image data into a data appropriate for being outputted by an output device, such as a printer, in which only a bilevel image data can be outputted suitably. When the dither process is applied to the image processing, the input multilevel tone data is compared with a predetermined dither matrix pattern so as to determine the value of a bilevel data for each pixel in the output image data. However, the dither process described above has a disadvantage in that a high resolution of a reproduced image is not compatible with a multiple gray level of the output image data, that is, it is inevitable in the case where the dither process is applied that the higher the resolution, the lower is the gray level.

On the other hand, there is another known halftone rendition technique which can provide a reproduced image having a good resolution together with a sufficient gray level. Such a prior halftone rendition technique is generally called the error diffusion method. This conventional error diffusion method has a feature, namely, that an error of optical density of an image produced when a bilevel rendition process is performed is stored in an error buffer memory for use in the bilevel rendition process of pixels adjacent to a pixel being considered so that the optical density of the image from an original document is maintained by the image processing after a multilevel tone process is performed. The multilevel tone process described above is a process that is performed in order to reduce the number of tone levels of input pixels to a number of tone levels of an output image data that can be outputted with a reproduced image having a suitable image quality by the output device including a copier, a facsimile and a printer. Conventionally, a bilevel rendition technique such as the dither process is applied to most of the output devices, because the output devices can suitably output a bilevel image data only. However, the multilevel tone process described above is not limited to the bilevel rendition process, as it can also include several multilevel rendition processes such as two-level, three-level, ... and sixteen-level rendition processes. The conventional error diffusion technique described above is disclosed, for example, in "Digital Halftoning" (the name of a paper contained in a journal published by the Institute of Television Engineers of Japan).

As described above, it is known that the conventional error diffusion process is often applied when a pseudo halftone data is generated from an input multilevel tone data inputted by the scanner. However, when the above conventional error diffusion technique adapted for bilevel rendition is applied without any modification or change to the multilevel tone process so that a processed image data is outputted by an output device, such as a printer, in which a multilevel tone data is assigned to each pixel included in the output image data, there is a problem in that a pseudo outline may sometimes be produced at portions of a reproduced image where the optical density of the reproduced image does not change clearly, or an undesired moire pattern may appear in the reproduced image especially when a screened halftone data is processed. In addition, the conventional error diffusion method adapted primarily for performing a bilevel rendition process has a disadvantage in that it is very difficult to supply a processed image data appropriate for being outputted by a printer in which a multilevel tone data is assigned to each pixel included in the output image data. To eliminate this problem, there is an improved multilevel tone process which does not use the prior error diffusion method for bilevel rendition, and in this multilevel tone process a multilevel rendition is carried out by a corrected data being compared with a plurality of predetermined threshold levels. However, the hardware of an error diffusion part of the image processing apparatus to which such an improved multilevel tone process is applied must be changed in accordance with the particular output device used, since there is a different optimal number of tone levels for each type of output device or printer.

SUMMARY OF THE INVENTION

Accordingly, it is a general object of the present invention to provide an improved image processing apparatus in which the above described problems of the conventional image processing apparatus are eliminated.

Another and more specific object of the present invention is to provide an image processing apparatus which can provide a multilevel output data appropriate for the output characteristic of an output device such as a printer in which a multilevel halftone is assigned to each pixel in a reproduced image, and can eliminate the occurrence of a pseudo outline or moire pattern. The above mentioned object of the present invention is achieved by an image processing apparatus which comprises a first correction part for correcting an error of a multilevel tone data inputted by an input unit from a document so that a corrected data having a specified number of bits is applied, a multilevel rendition part for generating a multilevel rendition data and an error data from the corrected data being compared with a plurality of predetermined threshold levels, an error diffusion part for carrying out a prescribed error diffusion of the error data from the multilevel rendition part and for supplying a resulting error data to the first correction part for use in an error correction process of a subsequent input data, and a second correction part for correcting the multilevel rendition data by a specified bit of the multilevel tone data inputted by the input unit so that a corrected multilevel image data that is appropriate for being outputted by an output unit in which a multilevel tone data is assigned to each pixel included in an output image data is supplied. According to the present invention, it is possible to produce a suitable halftone image from a multilevel tone image data inputted by a scanner. The shades of gray in the output image blend continuously in dot intensity, and a pseudo outline is not likely to appear in the output image, thereby ensuring a suitable image quality. And, regular intervals of dot intensity changes are eliminated, thereby preventing the occurrence of an undesired moire pattern in the output image even when a screened halftone image is processed.

Still another object of the present invention is to provide an image processing apparatus which has the same hardware as in the conventional apparatus and in which the number of quantized levels for each pixel is variable. The above mentioned object of the present invention is achieved by an image processing apparatus which comprises a correction part for correcting an error of a multilevel tone data inputted by an input unit from a document so that a corrected data having a specified number of bits is supplied, a multilevel rendition part for generating a multilevel rendition data and an error data from the corrected data being compared with a plurality of predetermined threshold levels and for supplying a multilevel image data that is appropriate for being outputted by an output unit in which a multilevel tone data is assigned to each one pixel included in an output image data, an error diffusion part for carrying out a prescribed error diffusion of the error data from the multilevel rendition part and for supplying a resulting error data to the correction part for use in an error correction process of a subsequent input data, and a level selection part for varying the number of tone levels of the error data which is supplied by the error diffusion part to the correction part, the multilevel image data having the number of tone levels varied by the level selection part. According to the present invention, it is possible to suitably vary the number of tone levels in a multilevel image data in accordance with the output characteristic of a printer. Also, a selection of the number of the tone levels can be carried out suitably with the same hardware as in the conventional image processing apparatus.

Other objects and further features of the present invention will be more apparent from the following detailed description when read in conjunction with the accompanying drawings.

BRIEF DESCRIPTION OF THE DRAWINGS

FIGS. 4(a-c) are charts showing an example of the contents stored in a read only memory for carrying out the function of the present invention shown in FIG. 2;

DESCRIPTION OF THE PREFERRED EMBODIMENT

First, a description will be given of the principle of the present invention. An example of an image processing technique to which the present invention is applied will be used for explaining the principle of the present invention. In this example, a 7-bit image data ID to which any of 128 gray levels is assigned (the value of the data ID ranges from 0 to 127) with respect to an input pixel being considered is present after the so-called gamma correction of the image data inputted by a scanner is performed. A multilevel error diffusion process for the image data ID is carried out, and a 9-level image data ID,' the value of which ranges from 0 to 8, is supplied. Then, a multilevel data correction process for the image data ID' is carried out, so that a 10-level image data ID" in which the least significant bit of the image data from the scanner is added to the image data ID' (the value of the image data ID" ranges from 0 to 9) is produced.

Similar to the conventional error diffusion process, after the related processes are completed, an error data G of adjacent pixels is added to the 7-bit image data ID from the gamma correction part, thus producing a corrected image data ID+G. A multilevel rendition process for this corrected image data ID+G is carried out by the corrected image data ID+G being compared with a plurality of predetermined threshold levels, thus producing a multilevel rendition image data ID'. In the present example, a 9-level image data ID' is produced in such a multilevel rendition process, so eight different threshold levels with which the corrected image data ID+G is compared are required for determining the value of each image data ID'. For example, the value of the image data ID' is determined as being equal to 1, when the corrected image data ID+G is greater than a threshold-1 which is, in this example, equal to 16. The value of the ID' is determined as being equal to 2, when the ID+G is greater than a threshold-2, which is equal to 32 in this example. Similarly, the value of the ID' is determined as being equal to 8, when the ID+G is greater than a threshold-8 which is in this example equal to 128. If the ID+G is smaller than the threshold-1 (=16), then the image data ID' is determined as being equal to zero (=0). In this manner, the multilevel rendition process of the present invention is carried out.

Figure 2:
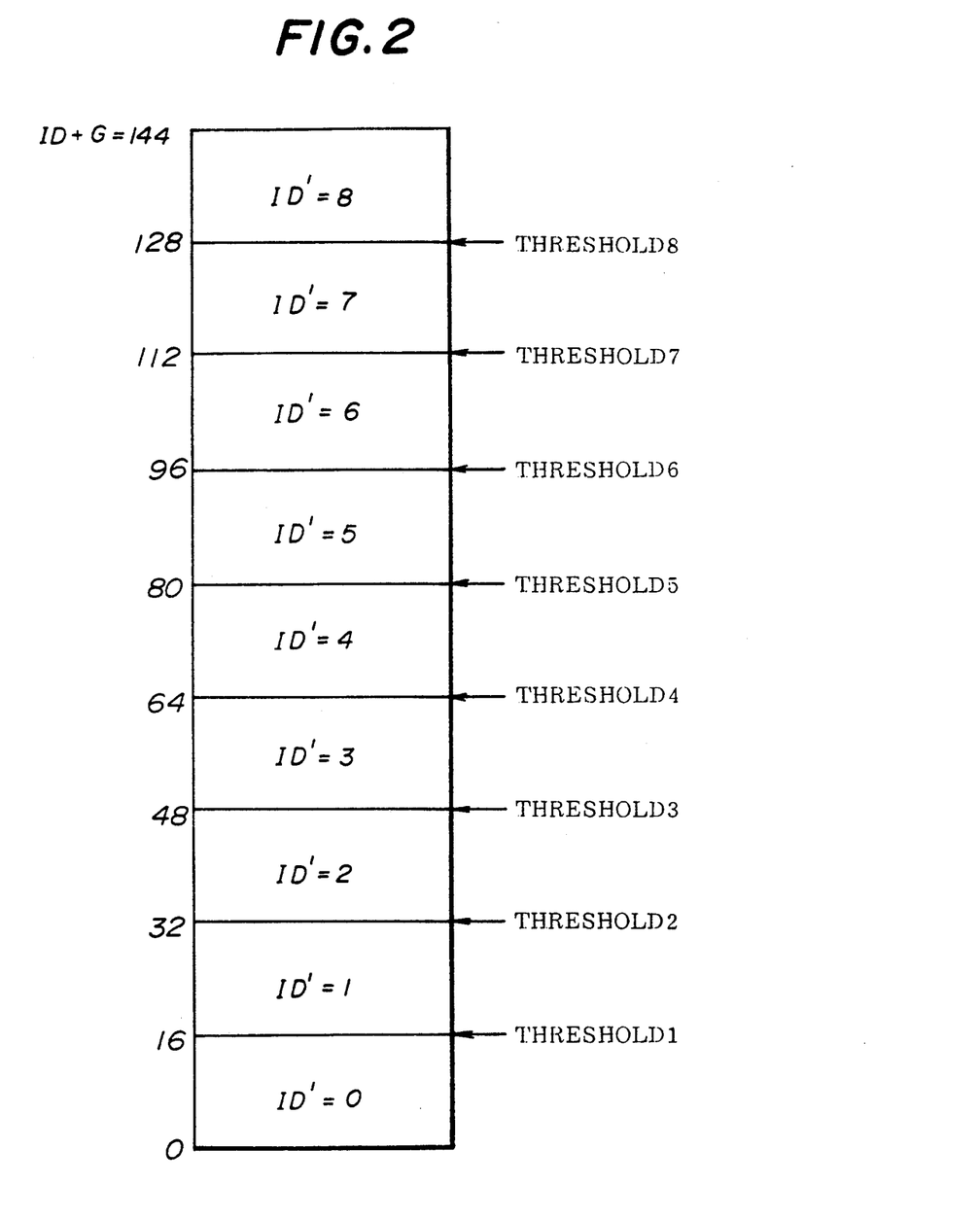
FIG. 2 is a diagram for explaining the principle of the present invention.

The relationship between the ID+G, the threshold levels and the ID' which is used by the present embodiment is illustrated in FIG. 2. In the present embodiment, intervals between separate threshold levels are equally spaced from each other, but, in other cases, the threshold levels as shown in the present example may be adjusted to other levels so as to suit the output characteristic of the output device such as a printer for outputting a multilevel tone data. For example, when a difference in optical density between 2nd level and 3rd level image data values is greater than a difference in optical density between 3rd level and 4th level values due to the output characteristic of the output device used, the difference between threshold-2 and threshold-3 values is adjusted so that it is greater than the difference between the threshold-3 and threshold-4 values.

Simultaneously with the performance of the multilevel rendition process described above, computing of an error is performed, according to the present invention. This error is computes as the difference between an input image data ID+G and a corrected image data corresponding to the highest predetermined threshold level that is exceeded by the input image data ID+G. For example, when a corrected image data ID+G is equal to 74, this data is greater than the value of threshold-4 (=64) but is smaller than the value of threshold-5 (=80). The error in this case is computed as being equal to a difference between 64 and 74, or being equal to 10. Similar to the conventional error diffusion process, the thus computed error is stored in an error buffer memory for use in the processing of subsequent pixels.

Figure 1:
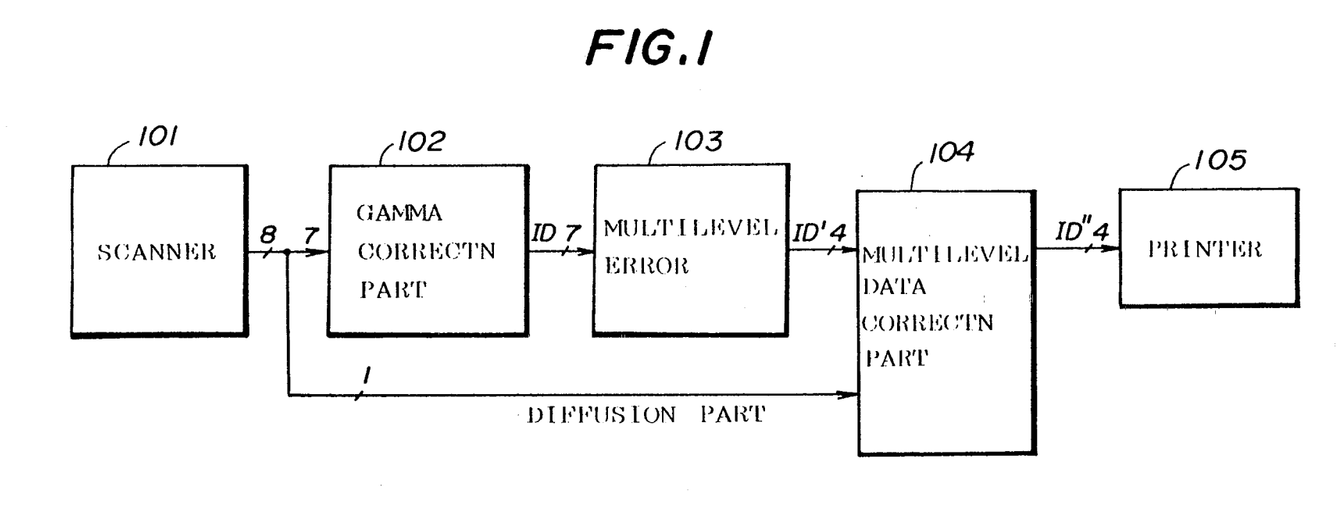
FIG. 1 is a block diagram showing an embodiment of an image processing apparatus according to the present invention.

FIG. 1 shows a first preferred embodiment of an image processing apparatus according to the present invention. In FIG. 1, this image processing apparatus generally has a scanner 101, a gamma correction part 102 for carrying out a gamma correction process of an original image data inputted by the scanner 101, a multilevel error diffusion part 103 for carrying out a multilevel error diffusion process of an image data ID from the part 102, a multilevel data correction part 104 for carrying out a multilevel data correction process of an image data ID' from the part 103, and a printer 105 for outputting the thus processed image data onto a recording sheet. The original image data which is read from an original document by the scanner 101 is made up of eight bits of a multilevel image data, the seven most significant bits of the data being supplied to the gamma correction part 102 and the least significant bit thereof being outputted to the multilevel data correction part 104.

Figure 3:
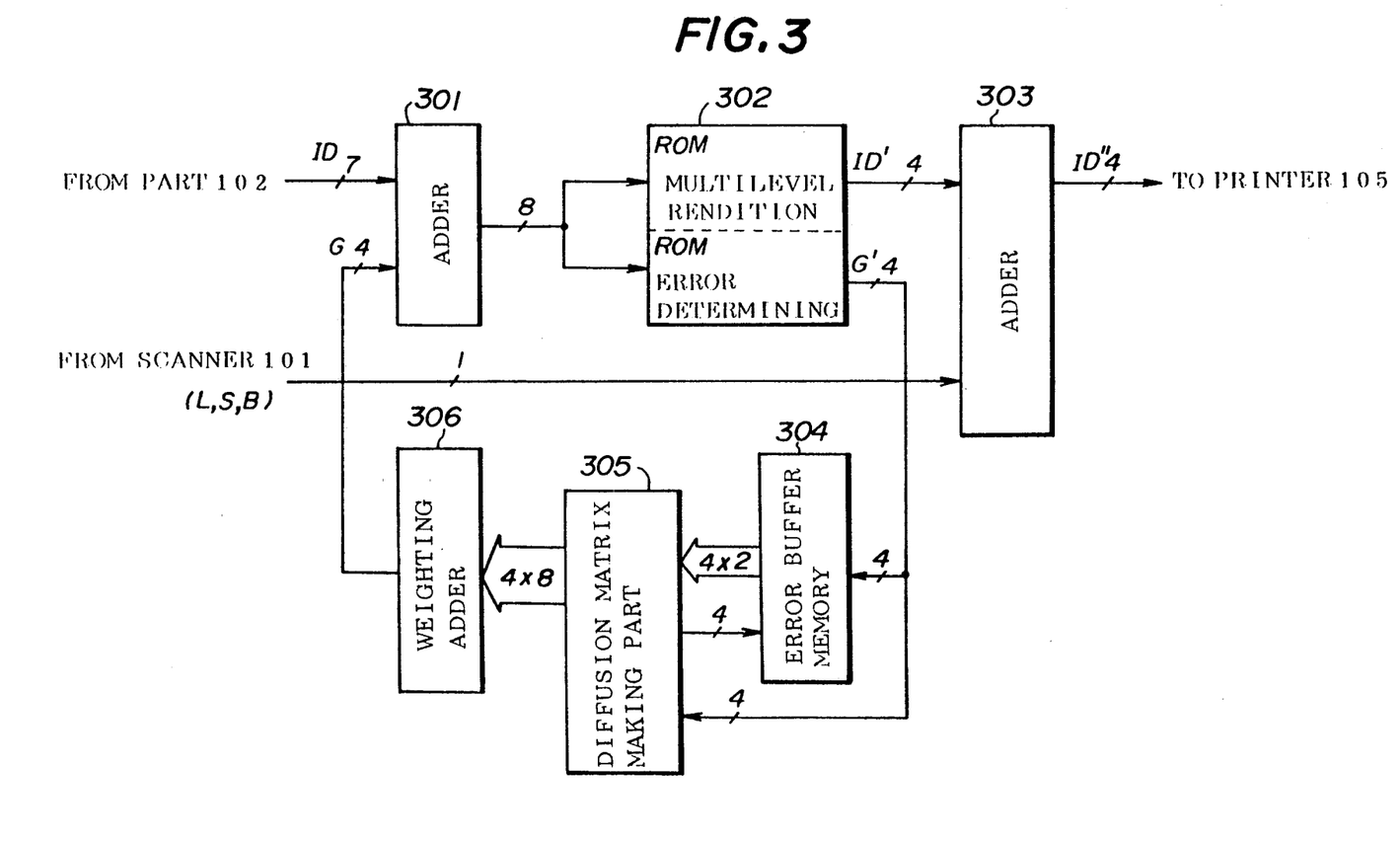
FIG. 3 is a block diagram showing an essential part of the image processing apparatus of the present invention.

FIG. 3 shows an essential part of the first embodiment of the image processing apparatus shown in FIG. 1. This essential part of the image processing apparatus includes an adder 301, a read only memory (ROM) 302, an adder 303, an error buffer memory 304, a diffusion matrix making part 305, and a weighting adder 306. An image data which is continuous with respect to the main scan direction of the scanner 101 in which a document is scanned is inputted by the scanner 101 and supplied to the gamma correction part 102.

Figure 4:
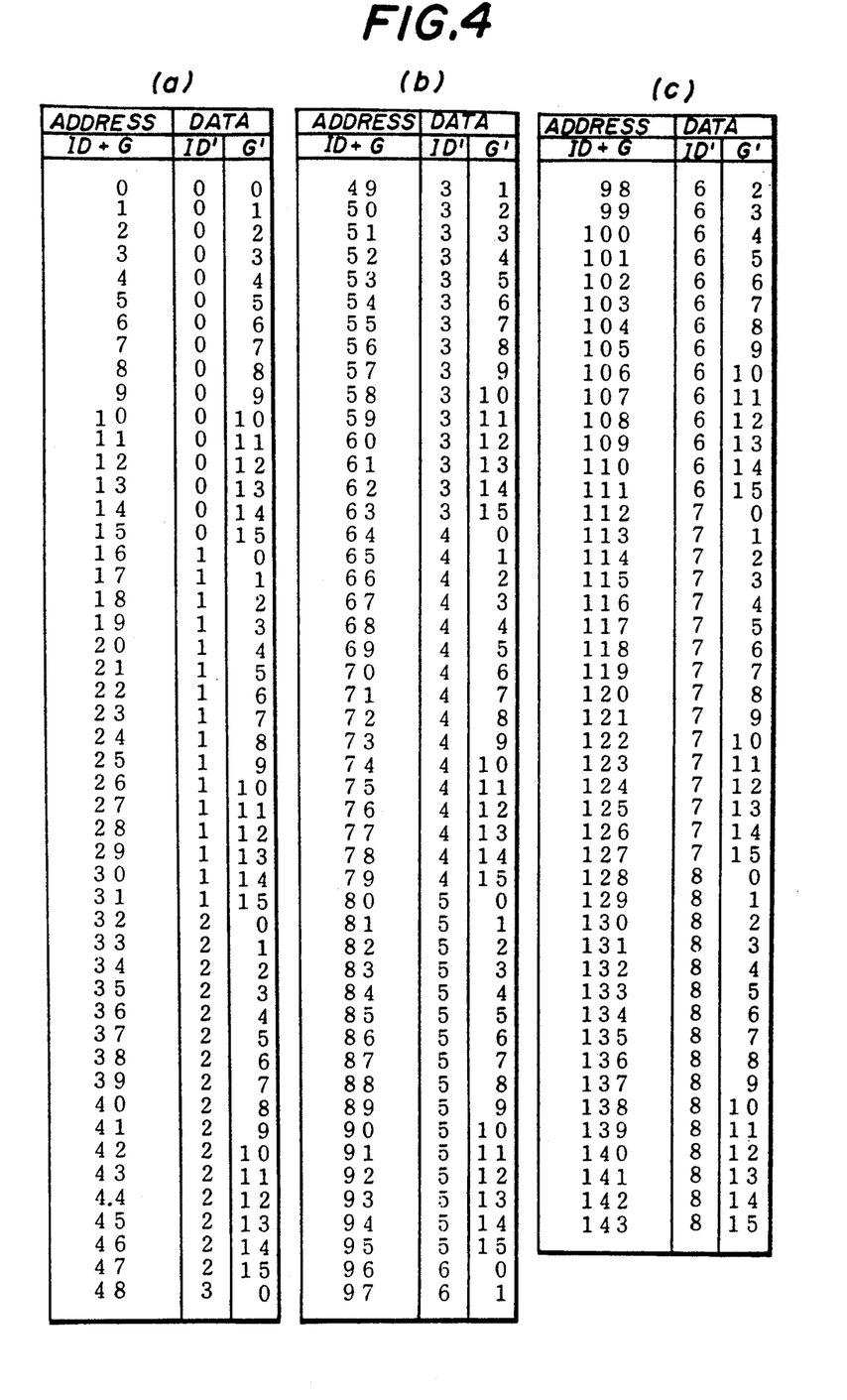

By means of the gamma correction part 102, a gamma correction of the image data from the scanner 101 is carried out and a 7-bit image data ID is supplied to the adder 301. By means of the adder 301, a 4-bit error data G resulting from the total of weighted errors with respect to the adjacent pixles, being supplied by the weighting adder 306 after the related processes are completed, is added to the 7-bit image data ID supplied from the part 102. The resultant 8-bit image data ID+G is supplied from the adder 301 to the ROM 302. In the ROM 302, a multilevel rendition process and an error computation are carried out, and the 8-bit image data ID+G inputted to the ROM 302 is used as an address of the memory indicating the corresponding 4-bit image data ID' and 4-bit error data G' stored in the ROM 302. This read only memory 302 has a storage capacity that can contain more than 8 bit×256 information, and the corresponding multilevel 4-bit image data ID' and the corresponding error data G' previously stored at the address of the memory, which address is indicated by the image data ID+G inputted to the ROM 302, are supplied to the adder 303 and to the error buffer memory 304, respectively. An example of the contents of the ROM 302 representing the relationship between the ID+G, the ID' and the G" is shown in FIG. 4. The 4-bit multilevel image data ID' is supplied from the ROM 302 to the adder 303, while the 4-bit error data G' is supplied to the error buffer memory 304 and stored in the error diffusion memory 304, and also suppled to the diffusion matrix making part 305 for use in the subsequent image processes.

Figure 5:
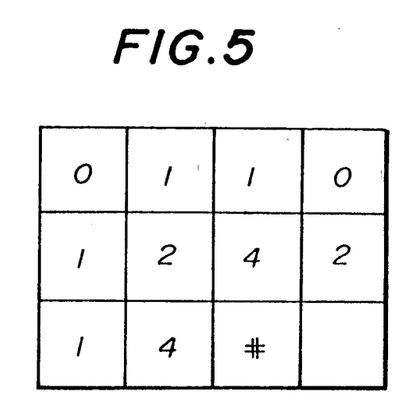
FIG. 5 is a diagram showing an example of an error diffusion matrix according to the present invention.

By means of the error buffer memory part 304, the diffusion matrix making part 305 and the weighting adder 306, the value of an error data G to be added to the input image data ID is computed. The smaller the distance of a data included in the diffusion matrix from the input pixel being considered, as shown in FIG. 5, the greater is the value of the data in the diffusion matrix, so that a greater weight is given to the errors of adjacent pixels, thereby rendering a greater influence on the input pixel being considered. In the example of the diffusion matrix shown in FIG. 5, # denotes the input image data for the input pixel being considered.

The following formula is used for computation of the value of the error data G as described above. Conventionally, this formula has been used for determining the value of weighted error data in the prior error diffusion process, and a description thereof will be omitted.

$$G = (G_{ij} \times W_{ij})$$

In this formula, $G_{ij}$ indicates the value of an error data of neighboring pixels, adjacent to the pixel being considered, stored in the error buffer memory 304, and $W_{ij}$ denotes the value of an element data in the diffusion matrix, as illustrated in FIG. 5.

The adder 303 shown in FIG. 3 corresponds to the multilevel data correction part 104 shown in FIG. 1. By means of the adder 303, the least significant bit of the image data from the scanner 101 is added to the 4-bit image data ID' supplied from the ROM 302, resulting in a 4-bit image data ID" which is supplied to the printer 105. In other words, a correction of a multilevel tone data after the error diffusion process is carried out by this adder 303. If the value of the least significant bit of the image data from the scanner 102 is equal to zero, then ID"=ID". If the above value is equal to 1, then ID"=ID"+1. When a multilevel tone data inputted by the scanner is made up of 8 bits, the least significant bit of the multilevel tone data has only a weight of 1/256 in relation to the data, and varies in a pseudorandom number sequence when the data is read from a document by means of the scanner. A correction of a multilevel data after the error diffusion process which is in accordance with the present invention is thus performed, and this correction will place a pseudorandom effect on the multilevel data after the error diffusion process.

Figure 6:
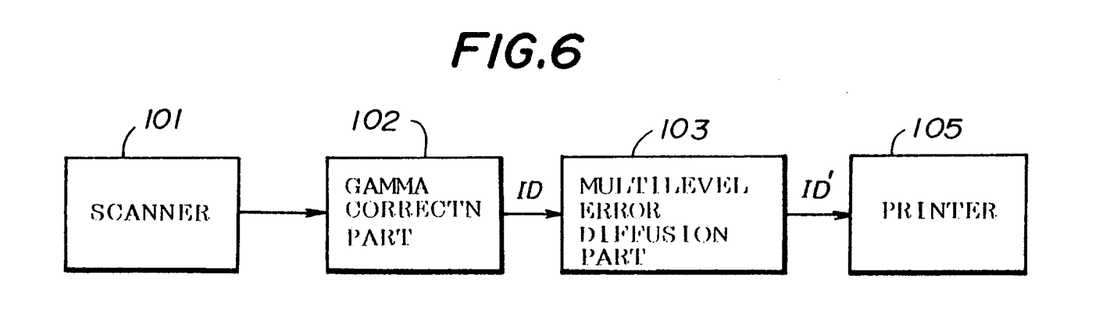
FIG. 6 is a block diagram showing another embodiment of an image processing apparatus according to the present invention.

FIG. 6 shows a second preferred embodiment of an image processing apparatus according to the present invention. In FIG. 6, those parts which are essentially the same as those corresponding parts in FIG. 1 are designated by the same reference numerals, and a description thereof will be omitted. In this image processing apparatus shown in FIG. 6, a gamma correction of an original image data inputted by the scanner 101 is carried out by the gamma correction part 102 to supply an image data ID to the multilevel error diffusion part 103. By means of the multilevel error diffusion part 103, a multilevel error diffusion of the image data is carried out, and an image data ID' is supplied to the printer 105 so that the thus processed image data is outputted by the printer 105 onto a recording sheet.

Figure 7:
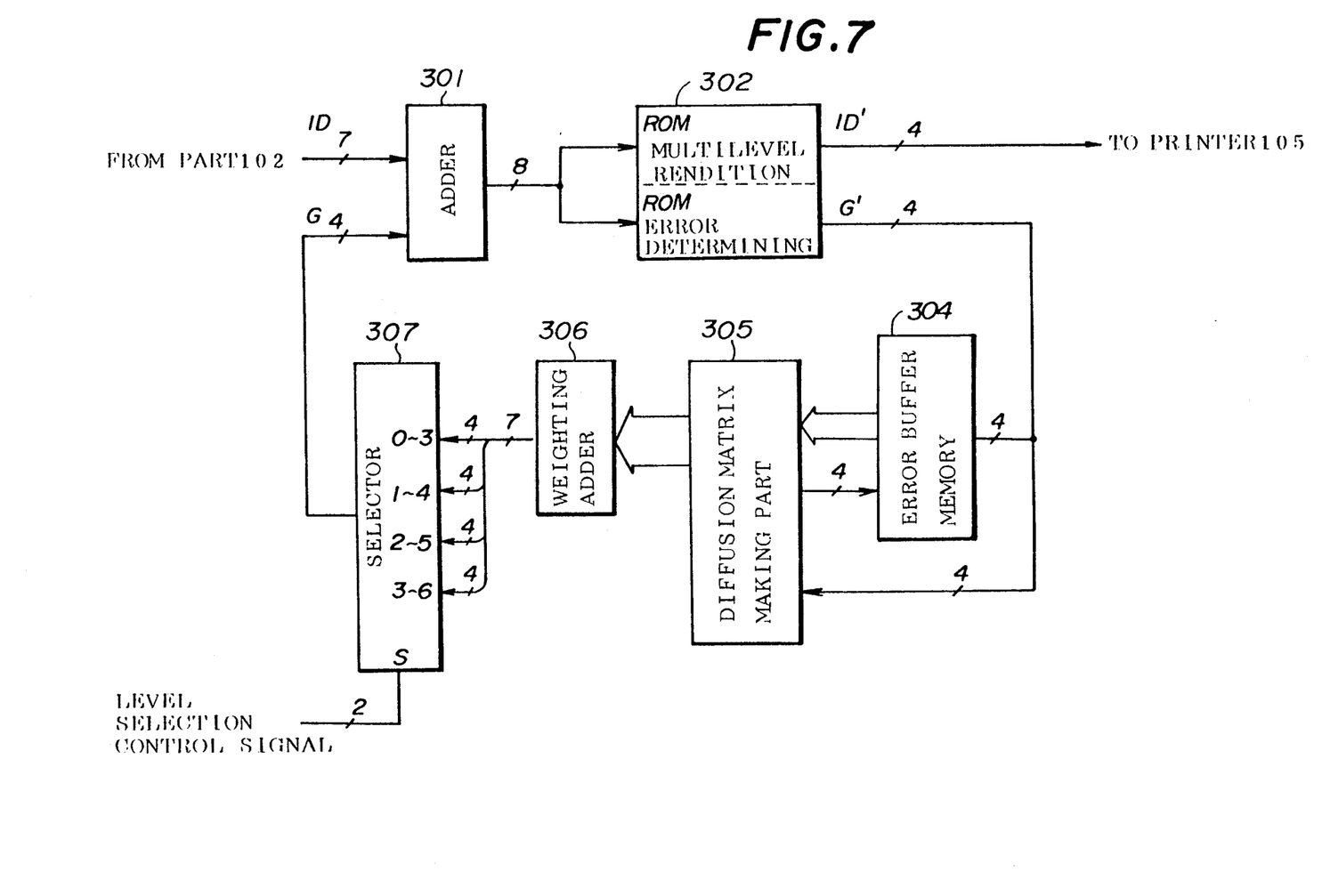
FIG. 7 is a block diagram showing an essential part of the image processing apparatus shown in FIG. 6.

FIG. 7 shows an essential part of the second embodiment of the image processing apparatus shown in FIG. 6. Those parts in FIG. 7 which are essentially the same as those corresponding parts in FIG. 3 are designated by the same reference numerals, and a description thereof will be omitted. An image data which is continuous with respect to the main scan direction is inputted by scanning a document by means of the scanner 101, and is then supplied to the gamma correction part 102. A 7-bit image data ID', corrected as a result of the gamma correction performed by the gamma correction part 102, is supplied to the adder 301. A 4-bit error data G resulting from the total of weighted errors with respect to the adjacent pixels, supplied from a selector 307 to the adder 301 after the related processes are completed, is added by the adder 301 to the corrected 7-bit image data ID supplied from the part 102. The resultant 8-bit image data ID+G from the adder 30 is supplied to the ROM 302.

In the ROM 302, a multilevel rendition process and an error computation are carried out, and the 8-bit image data ID+G inputted to the ROM 302 is used as an address of the memory indicating the corresponding 4-bit image data ID' and 4-bit error data G' stored in the ROM 302 to determine the results of the multilevel rendition and the error computation. This read only memory 302 has a storage capacity that can contain more than 8 bit×256 of information, and the multilevel 4-bit image data ID' and the error data G' previously stored at the address of the ROM 302, indicated by the image data ID+G inputted to the ROM 302, are supplied to the printer 105 and to the error buffer memory 304, respectively. An example of the contents of the ROM 302 representing the relationship between the ID+G, the ID' and the G' is shown in FIG. 4. The 4-bit ID' is supplied from the ROM 302 to the printer 105 so that image information is outputted, while the 4-bit error data G' is supplied to and stored in the error buffer memory 304, and also supplied to the diffusion matrix making part 305 for used in the subsequent processes.

By means of the error buffer memory part 304, the diffusion matrix making part 305 and the weighting adder 306, the value of an error data G to be added to the input image data ID is computed. As shown in FIG. 5, the smaller the distance of a data included in the diffusion matrix from the input pixel being considered, the greater is the value of the data in the diffusion matrix, so that a greater weight is given to the errors of adjacent pixels, thereby rendering a greater influence on the input pixel being considered. In the example of the diffusion matrix shown in FIG. 5, # denotes the input image data for the input pixel being considered.

A 7-bit error data which is computed by the weighting adder 306 is supplied to the selector 307. By means of the selector 307, a 4-bit error data G is selected out of the 7-bit error data from the weighting adder 306, and the selected 4-bit data (which is the error data G) is supplied to the adder 301. There are four selection methods for selecting a 4-bit error data G from the 7-bit error data, and a determination as to which method should be used for this selection of a 4-bit data from a 7-bit data is controlled by a 2-bit level selection control signal which is supplied to a terminal S of the selector part 307 from an external circuit. The four selection methods are as follows:

1. Bits 0 to 3 of 7-bit error data for making 9-level rendition
2. Bits 1 to 4 of 7-bit error data for making 5-level rendition
3. Bits 2 to 5 of 7-bit error data for making 3-level rendition
4. Bits 3 to 6 of 7-bit error data for making 2-level rendition The following formula is used for computing the value of the error data G as described above. Conventionally, this formula has been used for determining the value of weighted error data in the prior error diffusion process, and a description thereof will be omitted.

$$G = (G_{ij} \times W_{ij})$$

In this formula, $G_{ij}$ indicates the value of an error data of adjacent pixels stored in the error buffer memory 304, and $W_{ij}$ denotes the value of an element data in the diffusion matrix, as illustrated in FIG. 5.

As described in the foregoing, the image processing apparatus of the present invention can provide appropriate halftone output images from a multilevel tone image data inputted by a scanner. An error-corrected image data is processed through a prescribed error diffusion process. In the first embodiment of the image processing apparatus according to the present invention, the shades of gray in the output image blend continuously in dot intensity, and an undesired pseudo outline rarely appears in the output image, thus providing reproduced images having an appropriate image quality. Also, regular intervals of dot intensity changes are eliminated so as to prevent the occurrence of a moire pattern in the output image when a screened halftone image is processed. Moreover, according to the second embodiment, it is possible to suitably vary the number of tone levels of an outputted multilevel image data, and the conventional error diffusion process adapted for bilevel rendition is not used. Without modifying the hardware of an image processing apparatus, the number of tone levels of a multilevel image data to be outputted by a printer can be suitably selected in accordance with the respective output characteristic of individual printers being used.

Further, the present invention is not limited to the above described embodiments, and variations and modifications may be made without departing from the scope of the present invention.

What is claimed is:

1. An image processing apparatus comprising:
   first correction means for correcting an error of a multilevel tone data inputted by an input unit from a document so that a corrected data having a specified number of bits is supplied;
   multilevel rendition means for generating a multilevel rendition data and an error data from said corrected data being compared with a plurality of predetermined threshold levels;
   error diffusion means for carrying out a prescribed error diffusion of said error data from said multilevel rendition means and for supplying a resulting error data to said first correction means for use in an error correction process of a subsequent input data; and
   second correction means for correcting said multilevel rendition data by a specified bit of said multilevel tone data inputted by said input unit so that a corrected multilevel image data that is appropriate for being outputted by an output unit in which a multilevel tone data is assigned to each pixel included in an output image data is supplied.

2. The apparatus as claimed in claim 1, further comprising memory means for storing a set of predetermined multilevel rendition data and a set of predetermined error data, said memory means having, at an address of said memory means indicated by said corrected data from said first correction means, said multilevel rendition data and said error data which are generated by said multilevel rendition means.

3. The apparatus as claimed in claim 1, wherein the error correction of the multilevel tone data is carried out by said first correction means by addition of the error data supplied by said error diffusion means to the multilevel tone data inputted by said input unit, resulting in the corrected data having a specified number of bits.

4. The apparatus as claimed in claim 1, wherein the correction of the multilevel rendition data is carried out by said second correction means by addition of the least significant bit of the multilevel tone data inputted by said input unit to the multilevel rendition data supplied by said multilevel rendition means, resulting in said corrected multilevel image data that is appropriate for being outputted by an output unit in which a multilevel tone data is assigned to each pixel included in an output image data.

5. An image processing apparatus comprising:
   a) first correction means for correcting an error of a multilevel image data input by an input unit from a document, so as to supply first corrected data having a specified number of bits;
   b) multilevel rendition means for performing the functions of:
      1) generating (i) multilevel rendition data and (ii) first error data, by comparing the first corrected data with a plurality of predetermined threshold levels; and
      2) supplying corrected multilevel image data to an output unit, wherein the corrected multilevel image data allows the output unit to output an output image in which multilevel image data is assigned to each pixel of the output image; and
   c) error diffusion means for performing the functions of:
      1) carrying out a prescribed error diffusion of the first error data; and
      2) supplying second error data to the first correction means for use in an error correction process applied to subsequent input image data;
   wherein the diffusion means includes
      1) level selection means for selecting a number of bits for the second error data, so as to allow the multilevel rendition means to correct the multilevel rendition data using first corrected data which has been corrected using the selected number of bits of the second error data.

6. The apparatus of claim 5, wherein the multilevel rendition means includes:
   memory means for storing a set of predetermined multilevel rendition data and a set of predetermined first error data;
   wherein the corrected data of the first correction means, memory means stores specifies an address of the memory means storing the particular multilevel rendition data and the particular first error data which are generated by the multilevel rendition means.

7. The apparatus of claim 5, further comprising:
   control signal means for supplying to the level selection means, a level selection control signal in accordance with which the selected number of bits of the second error data is determined.

8. The apparatus as claimed in claim 5, wherein the level selection means includes means for selecting:
   a) a number of high-order bits for the second error data when the multilevel image data output by the multilevel rendition means has a relatively small number of tone levels; and
   b) a number of low-order bits for the second error data when the multilevel image data output by the multilevel rendition means has a relatively large number of time levels.

* * * * *